(12) United States Patent
Schulte et al.

(10) Patent No.: US 8,380,366 B1
(45) Date of Patent: Feb. 19, 2013

(54) APPARATUS FOR TOUCH SCREEN AVIONIC DEVICE

(75) Inventors: Christopher E. P. Schulte, Independence, OR (US); Bradley James Christiansen, Corvallis, OR (US)

(73) Assignee: Garmin International, Inc., Olathe, KS (US)

( * ) Notice: Subject to any disclaimer, the term of this patent is extended or adjusted under 35 U.S.C. 154(b) by 521 days.

(21) Appl. No.: 12/403,261

(22) Filed: Mar. 12, 2009

Related U.S. Application Data

(60) Provisional application No. 61/035,757, filed on Mar. 12, 2008.

(51) Int. Cl.
*G01C 23/00* (2006.01)
(52) U.S. Cl. ............... 701/3; 701/25; 701/120; 701/467
(58) Field of Classification Search ............... 701/3, 14, 701/25, 120, 467; 345/173, 980, 958, 158
See application file for complete search history.

(56) References Cited

U.S. PATENT DOCUMENTS

| | | | | |
|---|---|---|---|---|
| 5,047,946 | A * | 9/1991 | King et al. | 701/467 |
| 5,715,163 | A * | 2/1998 | Bang et al. | 701/467 |
| 5,991,688 | A * | 11/1999 | Fukushima et al. | 701/411 |
| 6,438,469 | B1 * | 8/2002 | Dwyer et al. | 701/16 |
| 6,705,990 | B1 * | 3/2004 | Gallant et al. | 600/300 |
| 7,126,583 | B1 * | 10/2006 | Breed | 345/158 |
| 7,312,725 | B2 * | 12/2007 | Berson et al. | 340/980 |
| 7,714,849 | B2 * | 5/2010 | Pryor | 345/173 |
| 2003/0045994 | A1 * | 3/2003 | Stratton et al. | 701/120 |
| 2003/0160708 | A1 * | 8/2003 | Knoop | 340/958 |
| 2006/0161870 | A1 * | 7/2006 | Hotelling et al. | 715/863 |
| 2007/0168120 | A1 * | 7/2007 | Vandenbergh et al. | 701/208 |
| 2007/0229474 | A1 * | 10/2007 | Okabayashi | 345/173 |
| 2008/0119972 | A1 * | 5/2008 | Peyrucain et al. | 701/14 |
| 2008/0147560 | A1 * | 6/2008 | Carvalho | 705/59 |
| 2008/0215192 | A1 * | 9/2008 | Hardman et al. | 701/3 |
| 2008/0306651 | A1 * | 12/2008 | Davis et al. | 701/35 |

OTHER PUBLICATIONS

Wikipedia, "Touchscreen," en.wikipedia.org, Nov. 28, 2007 [Online]. Available: http://web.archive.org/web/20071128060804/http://en.wikipeida.org/wiki/Touchscreen. [Accessed Jul. 31, 2012].*
Garmin nüvi® 310/360 Owner's Manual, dated Mar. 2006.
Garmin G1000® Pilot's Guide for Cessna Nav III, dated Nov. 2005.
Garmin GNS™ 530(A) Pilot's Guide and Reference, dated Feb. 2007.

* cited by examiner

*Primary Examiner* — Behrang Badii
*Assistant Examiner* — Shardul Patel
(74) *Attorney, Agent, or Firm* — Samuel M. Korte; Mohammad M. Ali

(57) ABSTRACT

An apparatus having a graphical touch screen for flight planning and navigation of an aircraft by a pilot. The touch screen may be a graphical interface operable to detect the presence and location of a physical object on or in proximity to the touch screen. The touch screen may be used to perform functions previously only accessible by knobs and buttons on avionic navigational and/or flight planning units. The apparatus may comprise the touch screen and a control device configured to receive and interpret signals from the touch screen. The control device may command the touch screen to display a map and to modify a stored route, such as a flight plan, based on pilot selections input via various gestures of the object on or proximate to the touch screen.

14 Claims, 4 Drawing Sheets

APPARATUS FOR TOUCH SCREEN AVIONIC DEVICE

RELATED APPLICATION

This Application, under the provisions of 35 U.SC. §119 (e), claims the benefit of priority to U.S. Provisional Application Ser. No. 61/035,757 filed Mar. 12, 2008, entitled "METHOD AND APPARATUS FOR TOUCH SCREEN AVIONIC DEVICE" the disclosure of which is incorporated herein by reference in its entirety.

BACKGROUND OF THE INVENTION

1. Field of the Invention

Embodiments of the present invention relate to aircraft navigation. More particularly, embodiments of the present invention relate to a touch screen navigation and flight planning device.

2. Description of the Related Art

Aircraft pilots typically create flight plans prior to departure including basic information such as departure and arrival airports, enroute waypoints, and approach, arrival and/or departure procedures.

A flight plan is a sequential series of waypoints through which the aircraft will travel. A waypoint may coincide with an airport or other existing ground landmarks, or may represent an imaginary point in the sky, such as a point where two radio signals intersect. Waypoints may be stored in a memory storage device of the aircraft for use by the pilot and/or the aircraft during flight.

Flight paths may be planned along pre-defined three-dimensional pathways in the sky called airways. Additionally, there are typically rules governing airway routing, covering altitude, airspeed, and requirements for entering and leaving the airway. Airways may intersect at navigational aids (navaids), at which the aircraft may change from one airway to another.

Maps and waypoints illustrating the flight plan may be provided to the pilot via a graphical display housed within a cockpit of the aircraft. The graphical display can be in communication with the memory storage device and some sort of user input, so that the pilot may view the flight plan, add waypoints to a flight plan, delete waypoints from a flight plan, invert a flight plan (for a return trip) or create a new flight plan to be viewed on the graphical display. The user input generally comprises physical controls such as one or more of a knob, a button, a joystick, a keyboard, a tracking ball, or other external devices.

SUMMARY

Embodiments of the present invention relate to an apparatus having a graphical touch screen for flight planning and navigation of an aircraft by a pilot within an aircraft cockpit. The touch screen may be a graphical interface operable to detect the presence and location of a physical object on or in proximity to the touch screen. The touch screen may be used to perform functions previously only accessible by knobs and buttons on avionic navigational and/or flight planning units, such as the Garmin® GPS 500W and GNS 530W devices, for example. In one embodiment of the invention, the apparatus may comprise the touch screen and a control device configured to receive and interpret signals from the touch screen.

The control device may be operable to command the touch screen to display a map and to modify a stored route, such as a flight plan, which is used by the pilot for navigation. For example, in one embodiment of the invention, when a point on the touch screen is selected by an object, such as a human finger, a signal corresponding with that point on the screen may be sent to the control device. In response to the point selected on the touch screen, the currently displayed image, and/or a variety of other factors, the control device may alter a flight plan, including adding or deleting waypoints, holding at a particular waypoint, inserting approach, arrival and/or departure procedures, etc., and then update the image displayed on the touch screen accordingly. To provide desired functionality, the control device may recognize various gestures made by a pilot on or in proximity to the touch screen, such as a touch, a drag, a slide, a tap, a double tap, a circular loop, combinations thereof, and the like.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
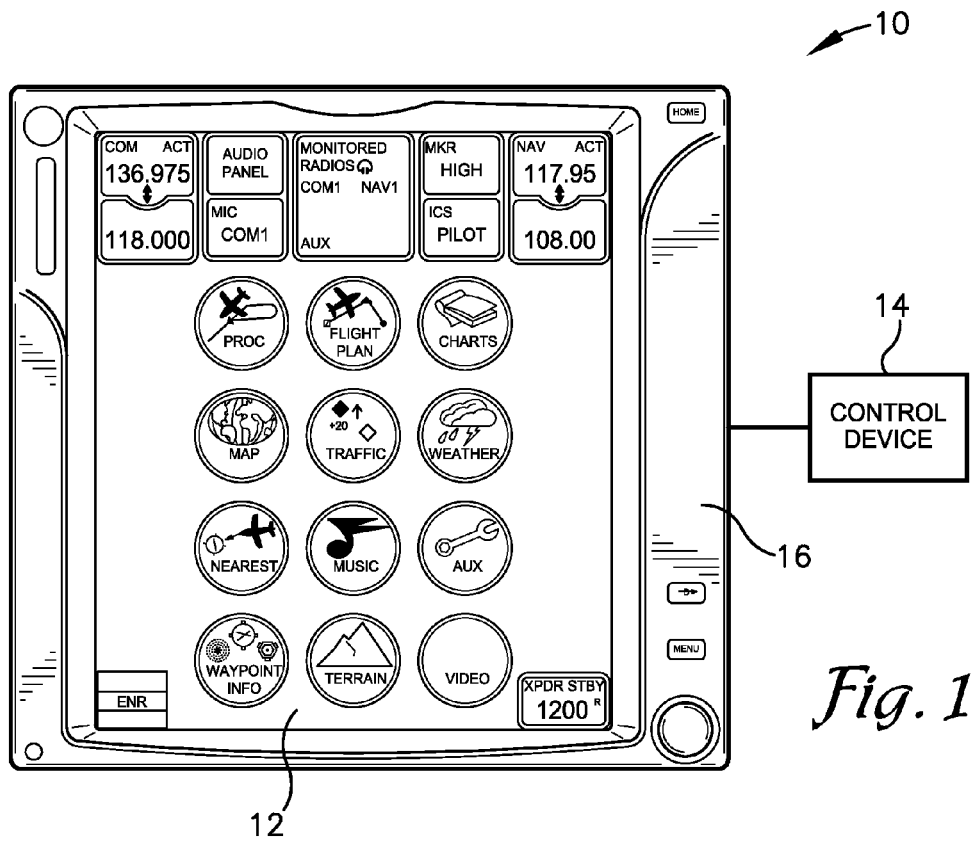
FIG. 1 is a schematic view of a graphical interface having a touch screen, a control device, and a housing in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of various embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

FIG. 1 illustrates an exemplary embodiment of an apparatus 10 for flight planning and navigation of an aircraft by a pilot. The apparatus 10 may comprise a graphical touch screen 12 and a control device 14. Furthermore, the apparatus 10 may comprise a housing 16 for at least partially encasing the touch screen 12 and the control device 14.

The touch screen 12 may be a graphical interface operable to display visual graphics, images, text, etc., and to detect the presence and location of a physical object on, in contact with, or in proximity to the touch screen 12. In some embodiments, the touch screen 12 is operable to detect the location of multiple objects (e.g., two fingers) that are on, in contact with, or otherwise proximate to the screen 12. The touch screen 12 may be used to perform functions previously only accessible by knobs, joysticks and buttons on avionic navigational and/or flight planning units, such as the Garmin® GPS 500W and GNS 530W devices, for example. The object may be a human finger, a stylus, or any other object operable to operate the touch screen 12 as described herein.

The touch screen 12 may be a resistive touch screen, an acoustic wave touch screen, a capacitive touch screen, an infrared touch screen, an optical touch screen, a strain touch screen, or any combination or equivalent thereof. Embodiments of the touch screen 12 do not necessarily require physical contact with the touch screen for manipulation of graphics displayed on the touch screen. For example, embodiments of the touch screen 12 including a capacitive touch screen may respond based on proximity to the touch screen, and do not have to be physically touched to select or manipulate graphics displayed on the touch screen.

If the touch screen 12 is of a type that detects the absence or presence of electromagnetic energy, such as infrared radiation, the object such as a finger may be used to physically block or reflect some of the waves. If the touch screen 12 includes a capacitive touch screen, it may comprise a layer of capacitive material to hold an electrical charge; touching the screen (or moving the object proximate to the screen) may change the amount of charge at a specific point of contact or proximity on the touch screen 12. If the touch screen 12 is of a resistive type, the pressure from the object may cause conductive and resistive layers of circuitry to touch each other, changing the circuitry's resistance.

The control device 14 may be communicably and/or physically coupled with the touch screen 12. In some embodiments of the invention, portions of the control device 14 may be integrated with the touch screen 12. For example, the control device 14 may include a first processor associated with the screen 12 to determine where a selection on the screen has occurred. The control device 14 may also include a second processor to receive information from the first processor and to provide the various flight and navigation functionality described herein. The control device 14 may comprise any number and combination of processors, controllers, integrated circuits, programmable logic devices, or other data and signal processing devices for carrying out the functions described herein, and may additionally comprise one or more memory storage devices.

In various embodiments of the invention, the control device 14 may implement a computer program and/or code segments to perform the functions described herein. The computer program may comprise a listing of executable instructions for implementing logical functions in the control device 14. The computer program can be embodied in any computer-readable medium for use by or in connection with an instruction execution system, apparatus, or device, and execute the instructions. In the context of this application, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, device or propagation medium. More specific, although not inclusive, examples of the computer-readable medium would include the following: a portable computer diskette, a random access memory (RAM), a read-only memory (ROM), an erasable, programmable, read-only memory (EPROM or flash memory), and a portable compact disk read-only memory (CDROM), combinations thereof, and the like.

The one or more memory storage devices may be integral with the control device 14, stand-alone memory, or a combination of both. The memory may include, for example, removable and non-removable memory elements such as RAM, ROM, flash, magnetic, optical, USB memory devices, and/or other memory elements. The one or more memory storage devices may store various data associated with the navigation of the aircraft, such as the computer program and code segments mentioned above, or other data for instructing the control device 14 and the touch screen 12 to perform the functions and display alterations described herein. Furthermore, the one or more memory storage devices may store, for example, user settings and flight planning and navigation data, such as maps, airways, waypoints, airports, cities, states, countries, aircraft settings, rules and regulations, saved flight plans, etc.

Figure 2:
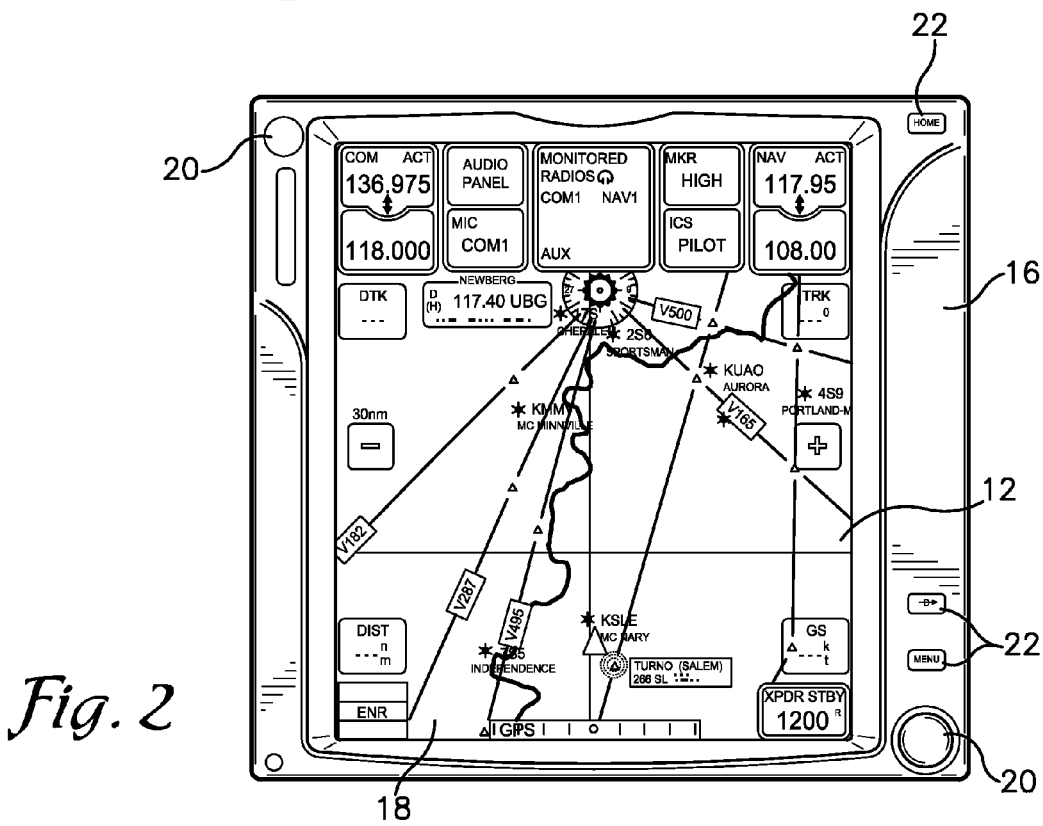
FIG. 2 is a screen shot of a map displayed on the touch screen of FIG. 1.

The control device 14 may be configured to receive and interpret signals from the touch screen 12 and then send signals back to the touch screen 12. Specifically, the control device 14 may be configured to output flight planning data and flight navigation data to the touch screen 12 in response to signals received from the touch screen 12. For example, the control device 14 may be configured to command the touch screen 12 to display a menu of options as in FIG. 1 and/or a map 18, as illustrated in FIG. 2, and to display a route or a flight plan used by the pilot for navigation. The flight plan or flight planning data may comprise waypoints, airways, holding commands, etc. illustrated on the map 18 or in text displayed on the touch screen 12. Waypoints may be graphically illustrated along airways on the map 18 and may correspond to landmarks or any coordinates used by the pilot for navigation.

The housing 16, as illustrated in FIG. 1, may be any housing for at least partially encasing the touch screen 12 and the control device 14. For example, the housing 16 may be a portable housing physically separate from the aircraft and sized and configured to be substantially portable, allowing the apparatus 10 to be used in a plurality of aircrafts without physical installing and uninstalling the device into the cockpit. Alternatively, the housing 16 may be integral with various elements of the aircraft or configured for installation within an aircraft flight panel. For example, the housing 16 may be configured for mounting within a center panel stack between the pilot and copilot or in any other location accessible by a pilot or copilot. In some embodiments, the housing 16 may present standard dimensions for center panel stack mounting, such as about 6.25 inches in width (Mark Width) and a height between about 2 inches and 7 inches.

The apparatus 10 may also comprise a flight control system (not shown) or other avionic equipment and the control device 14 may be communicably coupled to and/or physically integrated with the flight control system and the other avionic equipment. For example, the housing 16 may be integral with a housing of the flight control system. The various avionic equipment that may be coupled with or integrated with the apparatus 10 include a satellite navigation receiver (e.g., a GPS receiver to determine a current position of the apparatus 10), communication radios for communication with Air Traffic Control or other aircraft, navigation radios for communication with ground-based navigational aids, weather systems (radar, datalink), traffic information systems, audio panel control, satellite radio systems, pressure altitude systems, fuel flow data systems, air data computer (wind speed, direction, temperature, airspeed), combinations thereof, and the like. The apparatus 10 may additionally interface with, and/or be integrated with, a primary flight display (PFD), a multi-function display (MFD), or the like. For example, the apparatus 10 may be configured to output various data and information to the PFD and/or MFD.

The housing 16 may further comprise various knobs 20, joysticks (not shown), and buttons 22 located on or proximate an outward face of the housing 16 and communicably coupled with the control device 14. The knobs 20, joysticks, and buttons 22 may augment the manipulation capabilities provided by the touch screen 12.

In use, the apparatus 10 may be controlled by a pilot or any user via the touch screen 12. The pilot may select a point on the touch screen 12 by placing the object on or proximate the screen, prompting the touch screen 12 to send a corresponding signal to the control device 14. The term "select" (and any variations of the word "select", such as "selection", "selecting", "selected", etc.) is defined herein as the act of either physically touching the screen with the object or placing the object in close proximity with the screen 12, thereby resulting in a response signal being sent by the screen 12 to the control device 14. The response signal may include information representative of particular coordinates on the touch screen 12 selected based on the location of the object relative to the touch screen 12, information concerning movement of the object relative to the touch screen, such as speed and direction, information concerning pressure applied by the object against the touch screen 12, combinations thereof, and the like. In some embodiments, the screen 12 may present a multi-touch configuration operable to detect two or more positions of objects (e.g., two fingers) in relation to the screen 12. Utilization of multi-touch functionality enables the pilot to gesture using two or more fingers to input various information or commands for use by the control device 14.

Based on the response signal received by the control device 14, the control device may command the touch screen 12 to alter the display accordingly. For example, selecting a point on the screen may result in adding a graphic, deleting a graphic, highlighting a graphic, moving a graphic, etc. Additionally or alternatively, if the apparatus 10 is in communication with various control systems, such as the flight control system, the interaction of the object with the touch screen 12 may result in the control device 14 outputting signals for changing the settings or state of various sensors, actuators, memory storage devices, etc.

In one embodiment of the invention, when the touch screen 12 is selected by the object, a signal corresponding with that selection may be sent to the control device 14. In response to the type of selection, the location of the selection, the currently displayed image or map 18, and/or a variety of other factors, the control device 14 may be configured to alter a flight plan, including adding or deleting waypoints, holding at a particular waypoint, inserting approach, arrival and/or departure procedures, etc. and then send a signal to the touch screen 12 to update the image displayed on the touch screen 12 accordingly. The types of selections or gestures of the object to which the touch screen 12 may be operable to respond may include a single point selection, dragging along the touch screen 12 from a first point on the touch screen 12 to a second point on the touch screen 12, double selecting a point on the touch screen 12 by selecting the point twice in rapid succession, etc.

Examples of how various graphical elements of the map 18 may be manipulated by the pilot to create and edit a flight plan are illustrated in FIGS. 3-7. Note that selecting various points on the map 18, as described below, is defined herein as selecting a point on the touch screen 12 corresponding to a point on the map 18. Furthermore, as described above, any alterations to the map 18 displayed on the touch screen 12 may be in response to a command signal from the control device 14. The command signal from the control device 14 may correspond to the response signal sent from the touch screen 12 to the control device 14 relative to a selection by the object.

The map 18 may be a moving map corresponding to a location of the apparatus 10 determined by a global positioning system (GPS) receiver or any other location-determine system including ground based and inertial navigation systems. As the aircraft moves, a displayed portion of the map 18 may automatically pan across the touch screen 12 as required to provide a continuous view of the aircraft's location. Additionally or alternatively, the location shown by the map 18 may be selected by the pilot and moved relative to the touch screen 12 based on input by the pilot.

For example, the apparatus 10 may be configured to pan, zoom, scale, and/or rotate the map 18 in response to selections by the pilot. The selections indicating pan, zoom, scale, and/or rotate may be any of the gestures described herein or any combination thereof. For instance, the pilot may drag his or her finger across the screen 12 to pan the map 18, rotate the map using a two-finger rotation gesture, zoom or scale the map by tapping or using two-finger pinch gestures, combinations thereof, and the like. The pilot may also double select, double tap, and/or press and hold on a selected point of the map 18 to display information associated with the selected point, such as waypoint information. Alternatively, one or more icons may be presented on the map 18 indicating pan, zoom, scale, and/or rotate, and may be selected by the pilot to perform the corresponding function.

Figure 3:
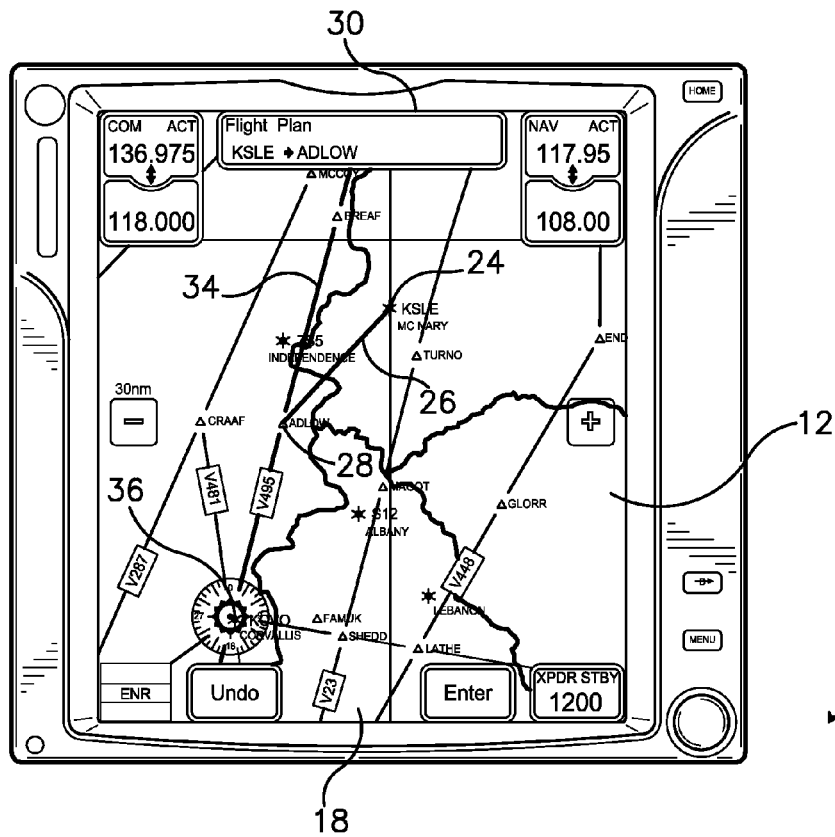
FIG. 3 is a screen shot of a flight plan and a first flight route line extending from a first waypoint to a second waypoint displayed on the touch screen of FIG. 1.

In FIG. 3, a first waypoint 24 is selected on the map 18 corresponding to a departure location of a flight starting from KSLE, Salem, Oreg. A first flight route line 26 representing a first leg of the flight to ADLOW is added to the map 18 displayed on the touch screen 12 by selecting ADLOW using the object—such as by the pilot touching the ADLOW icon. This results in the map 18 illustrating the first flight route line 26 extending from the first waypoint 24 to a second waypoint 28 corresponding to the location of ADLOW on the map 18. Additionally, the selection of ADLOW may cause a window 30 listing waypoints of the flight plan to add ADLOW to displayed list. Thus, embodiments of the present invention do not require the pilot to manually adjust the various knobs 20 and buttons 22 to create the flight route line 26—thereby allowing the rapid entry of flight planning information.

Figure 4:
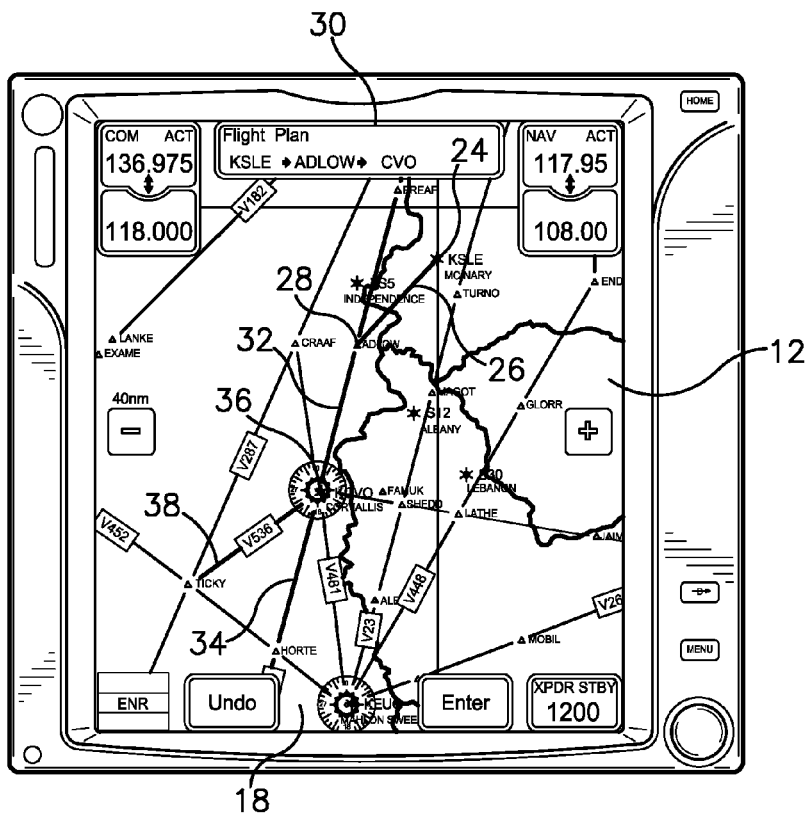
FIG. 4 is a screen shot of a second flight route line formed along a first airway and extending from the second waypoint to a third waypoint intersected by a second airway displayed on the touch screen of FIG. 1.

A second flight route line 32 and a third waypoint 36 may be chosen and/or inserted into the flight plan by selecting any part of a first airway 34, such as airway V495 illustrated in FIGS. 3-4, causing the entire airway to be highlighted, and then subsequently selecting any exit waypoint located along the first airway 34 to be the third waypoint 36. In this example, any waypoint along airway V495 between the second waypoint 28 and the third waypoint 36 may also be added to the flight plan automatically, and the second flight route line 32 may be a plurality of flight route lines extend from the second waypoint 28 to various intermediate waypoints and from the various intermediate waypoints to the third waypoint 36.

Alternatively, the second flight route line 32 may be added by selecting the first airway 34, such as airway V495 as described above, causing the entire airway to be highlighted, then selecting any intersecting airway, such as a second airway 38. This may add the third waypoint 36 to the flight plan at a location where the two airways 34, 38 intersect and may automatically add all waypoints along the first airway 34 between the second waypoint 28 and the third waypoint 36. For example, in FIG. 4, the pilot selected any point on the screen corresponding with airway V536 (the second airway 38), causing airway V536 to be highlighted and causing a flight route line to form between ADLOW and CVO, thereby entering CVO into the flight plan as shown in the flight plan window 30.

Figure 5:
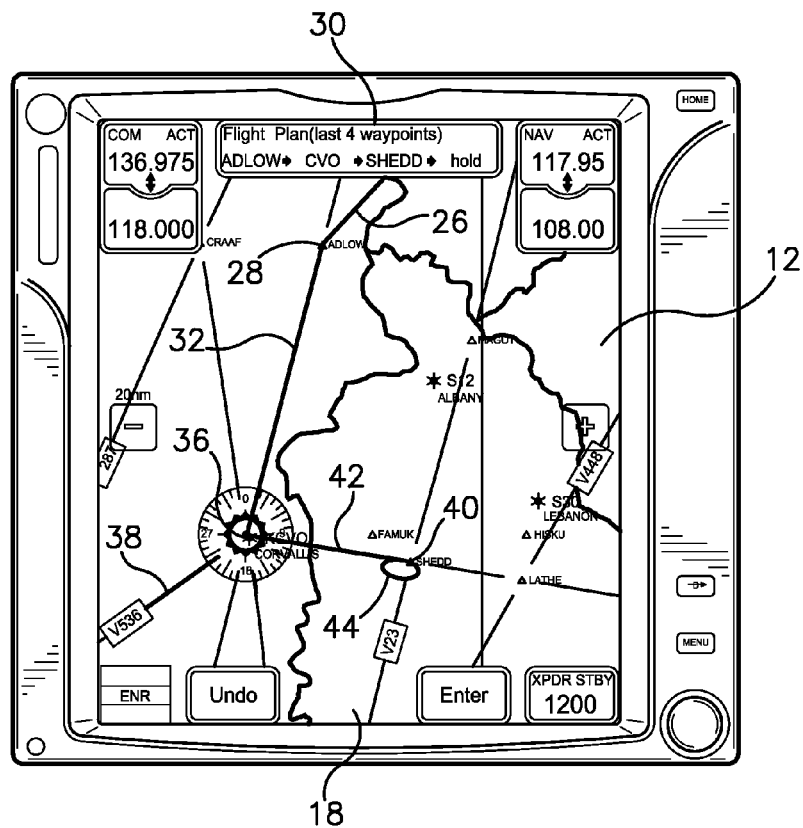
FIG. 5 is a screen shot of a third flight route line and a graphical element at a fourth waypoint displayed on the touch screen of FIG. 1 indicating for the pilot to hold at the fourth waypoint.

In the example illustrated in FIG. 5, the pilot selects a fourth waypoint 40 corresponding with the location of SHEDD on the map 18, causing the control device 14 to command a third flight route line 42 to appear on the map 18. Then the pilot may drag or move the object around a point on the touch screen 12 corresponding with the fourth waypoint 40 to substantially circle the fourth waypoint 40. This circular motion may cause a racetrack pattern, circle, oval, or any shape 44 to be formed substantially around or proximate the fourth waypoint 40, indicating to the pilot to hold upon reaching that waypoint. Further, the holding pattern course, size (typically measured by the time it takes to fly the inbound or outbound leg), and whether or not the holding pattern is standard (right-hand turns) or non-standard (left-hand turns) may be modified using the screen 12. For instance, the pilot may select one or more parts of a displayed holding pattern to modify the holding pattern. As an example, the pilot may select an outbound leg of a holding pattern to change the size of the holding pattern and select an inbound leg (or the turn to the inbound leg) to rotate the holding pattern to a desired course, or switch to a non-standard holding pattern using one or two-finger gestures. In an embodiment of the invention where the apparatus 10 is coupled with the flight control system, the flight control system may be commanded to hold the aircraft at the location denoted by shape 44 once it is reached by the aircraft, but may allow the pilot to edit the hold by selecting the fourth waypoint 40 again.

Figure 6:
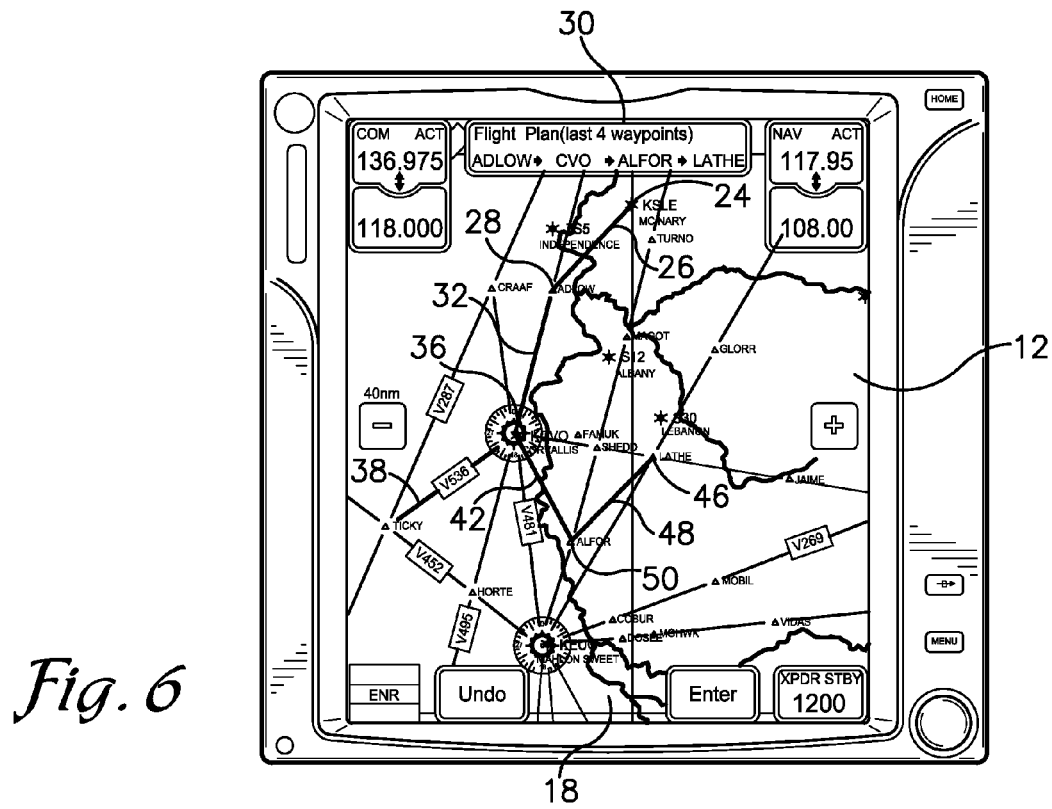
FIG. 6 is a screen shot of a fourth flight route line, a fifth waypoint, and a new fourth waypoint displayed on the touch screen of FIG. 1.

In FIG. 6, a fifth waypoint 46 at LATHE is added to the flight plan, resulting in a fourth flight route line 48 to be added to the map 18. The fourth flight route line 48 may appear between the fourth and fifth waypoints 40, 46, from SHEDD to LATHE on the map 18. However, in the example of FIG. 6, a conflict at SHEDD causes the pilot to modify the flight plan. Therefore, FIG. 6 illustrates the resulting image displayed when the pilot selects ALFOR to replace the fourth waypoint 40 at SHEDD. This may be accomplished by selecting the fourth waypoint 40 at SHEDD and then dragging or moving the object along the screen to ALFOR, making ALFOR a new fourth waypoint 50. This change in the flight plan may reroute the third flight route line 42 to extend from the third waypoint 36 to the new fourth waypoint 50 and the fourth flight route line 48 to extend from the new fourth waypoint 50 to the fifth waypoint 46 on the map 18. Modification of waypoints within a flight plan may include deleting a waypoint from the flight plan and/or adding an additional enroute waypoint between two existing waypoints in the flight plan. Such waypoint modification may be performed as discussed above. For example, a waypoint may be added to a flight route line by dragging a flight route line over or to the desired waypoint. Similarly, a waypoint may be removed from a flight route line by dragging the flight route line away from the undesired waypoint. Waypoints may also be added or deleted using other gestures, such as tapping, pressing and holding, etc.

The apparatus 10 may provide various interface functionality to facilitate modification of waypoints and associated flight route lines. For example, if a point along a flight route line is selected by the pilot, the pilot may hold selection of the flight route line point and drag his or her finger across the screen 12. As the pilot drags his or her finger across the screen 12, the selected point of the flight route line may follow the pilot's finger around the screen 12—while other portions of the flight route line remain stationary—thereby providing a rubber band-like display to enable the pilot to visually see how the flight route line is being modified by movement of a selected point along the line. Example rubber-band like display functionality is illustrated by FIGS. 5 and 6, where flight route line 42 is pulled by the pilot to waypoint 50 to create the fourth flight route line 48. In some embodiments, the pilot may select a plurality of points along a flight route line (using multiple fingers) and simultaneously move the various selected points about the screen 12, while other non-selected points remain stationary.

To facilitate waypoint selection as the pilot drags a flight route line about, the control device 14 may provide snap-to waypoint functionality where a selected flight route line may be easily modified to snap to one or more waypoints when the flight route line is positioned (e.g., dragged) in closed proximity to one or more of the waypoints. Such functionality enables the pilot to rapidly modify waypoints and flight route lines without tediously selecting the exact location of the various waypoints on the screen 12.

Figure 7:
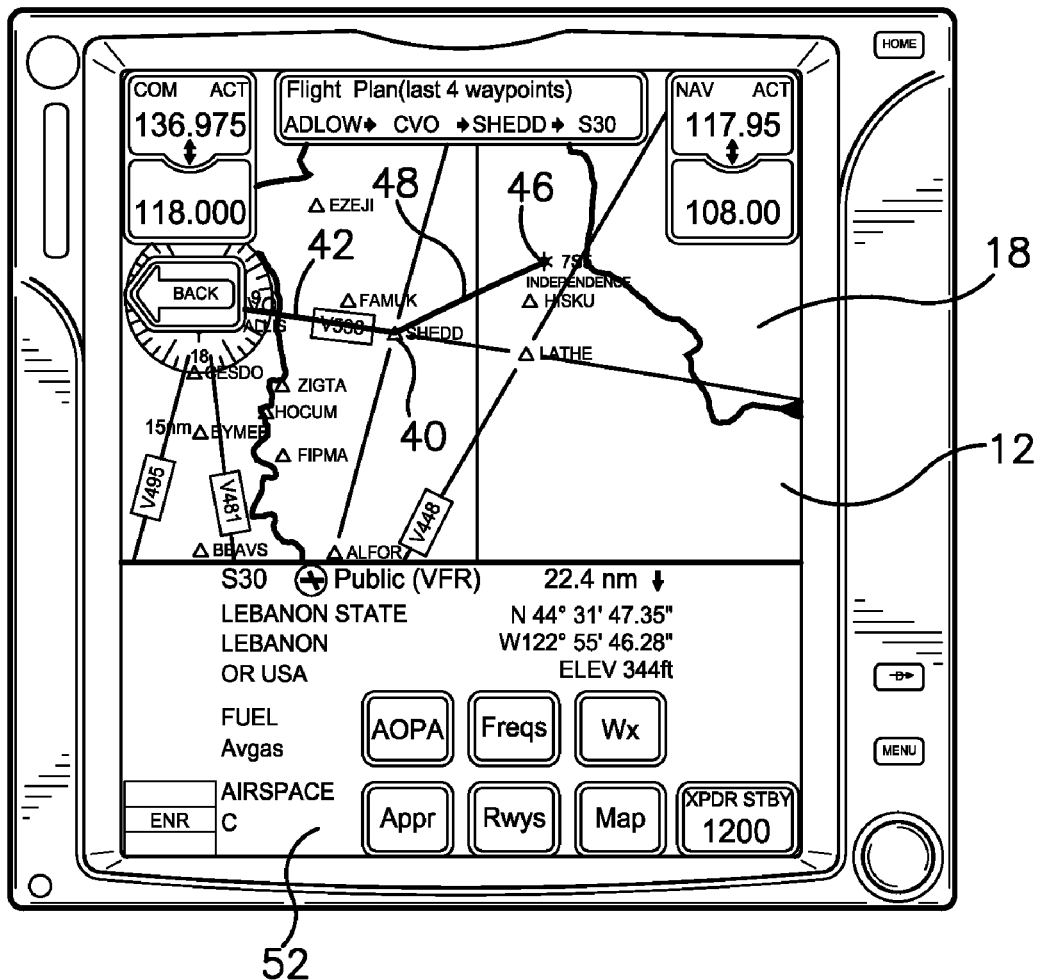
FIG. 7 is a screen shot of waypoint information displayed on the touch screen of FIG. 1 in response to a pilot double selecting a waypoint associated with an airport.

In FIG. 7, the fifth waypoint 46 is illustrated as S30, with the fourth flight route line 48 extending from the fourth waypoint 40 at SHEDD to the fifth waypoint 46 at S30. The pilot may double select the fifth waypoint 46, S30, to quickly bring up waypoint information 52 onto the screen, as illustrated in FIG. 7. Waypoint information for an airport may include information such as facility name, location, elevation, communication frequencies, approach procedure information, etc. Approach procedure information may include a list of published approaches into the airport, and/or a list of waypoints in a selected approach procedure. Double selecting may be, for example, double tapping or pressing and holding on a point on the touch screen 12 corresponding to the fifth waypoint 46 or otherwise selecting the fifth waypoint 46 and then selecting it again in some manner. In some embodiments of the invention, double selecting a waypoint may cause an icon or icons (not shown) to appear which may provide the pilot with options for displaying various types of information such as the waypoint information 52, or approach procedure information for example. Then the pilot may select the icon to view the desired information such as an approach selection page with various data and selection options displayed.

In addition to the gestures described above, other gestures may be used for flight planning functions on the touch screen 12, such as simultaneously tapping or simultaneously selecting two discrete points on the touch screen 12 to create a flight route line between the points. Furthermore, multiple waypoints may be selected simultaneously by drawing a box, circle, or other region around the multiple waypoints with one or two or more fingers. Flight plan information may be deleted by, for example, swiftly swiping the object on the touch screen 12, and secondary flight planning menus may also be pulled up for display using various gestures such as taps, flicks, drags, pressing and holding, and the like.

The use of touch input by the apparatus 10 provides a faster, more intuitive way of creating and editing a flight plan than systems solely employing physical controls such as knobs, buttons, and keyboards. Because the touch screen 12 doubles as an input device and a display screen, at least some buttons and knobs may be omitted, allowing the apparatus 10 to be smaller, or have a larger display, than systems employing only physical controls. The many gestures to which the touch screen 12 may respond also provide a variety of functions and options to the pilot without requiring the pilot to memorize keyboard commands or navigate through a series of menu screens or drop down menus.

Although the invention has been described with reference to the embodiments illustrated in the attached drawing figures, it is noted that equivalents may be employed and substitutions made herein without departing from the scope of the invention as recited in the claims. For example, while particular gestures and motions of the object relative to the touch screen 12 are described herein, it should be noted that other gestures and motions of the object relative to the touch screen 12 may be used to generate identical or similar manipulations or indications without departing from the scope of the invention. Additionally, the gestures and motions of the object relative to the touch screen 12 may result in different corresponding reactions by the touch screen 12, control device 14, and/or flight control system than those described herein. For example, when a waypoint is substantially circled, it may change colors instead of displaying the shape 44 around the waypoint to indicate a hold.

Furthermore, the locations, waypoints, and order of manipulation and gestures described herein and illustrated in FIGS. 3-7 are merely examples, and may be performed any number of times for any locations in any order to create any flight plan desired. Also, though the apparatus 10 is described for use in an aircraft, the apparatus 10 may be located in a separate location from the aircraft and/or controlled by a user not physically located on the aircraft.

Having thus described various embodiments of the invention, what is claimed as new and desired to be protected by Letters Patent includes the following:

1. An apparatus for flight planning and navigation of an aircraft, the apparatus comprising: a graphical and capacitive touch screen operable to display graphics and detect the presence and location of a physical object on or in proximity to the screen; and a control device configured to output flight planning data and flight navigation data to the screen in response to input received from the screen, wherein the control device is configured to command the screen to display a flight route line from a first waypoint illustrated on a map displayed on the screen to a second waypoint illustrated on the map in response to the object selecting a first point and then a second point on the screen corresponding with the first waypoint and the second waypoint, wherein the control device is configured to command the screen to move or reconfigure a flight route line to intersect a third waypoint illustrated on the map, wherein the control device is configured to command the screen to display an indication that the flight should hold upon reaching a particular waypoint in response to the object selecting and then circling around a point on the screen corresponding to the particular waypoint, wherein the control device is configured to command the screen to display information relevant to a landing approach of the aircraft in response to the object selecting a point on the screen twice in rapid succession, wherein the point on the screen corresponds with a location or waypoint on a map displayed on the screen.

2. The apparatus of claim 1, wherein the control device is configured to command the screen to display the flight planning data, wherein the flight planning data includes a waypoint illustrated on a map relative to a location on the screen selected by the object.

3. The apparatus of claim 1, wherein the control device is configured to command the screen to move or reconfigure the flight route line to intersect the third waypoint illustrated on the map in response to the object selecting a portion of the screen corresponding to any point along the flight route line and then the object sliding along the screen to a point on the screen corresponding to the location of the third waypoint illustrated on the map.

4. The apparatus of claim 1, wherein the control device is configured to command the screen to display a first airway, a second airway, and flight route lines extending between a plurality of waypoints along the first airway in response to the object selecting a first point on the screen corresponding with a first waypoint located on a first airway, selecting a second point on the screen corresponding with any location along the first airway, and selecting a third point on the screen corresponding with any location along the second airway, wherein the plurality of flight route lines extend along the first airway from the first waypoint to a waypoint at an intersection of the first airway and the second airway.

5. The apparatus of claim 1, further comprising a housing for at least partially encasing the screen and the control device.

6. The apparatus of claim 1, further comprising a flight control system within an aircraft, wherein the control device is communicably coupled to and physically integrated with the flight control system.

7. The apparatus of claim 1, wherein the control device is operable to alter at least one of data or graphics displayed on the screen in response to at least one of touching the screen, sliding an object along the screen, and tapping the screen one or more times.

8. An apparatus for flight planning and navigation of an aircraft, the apparatus comprising: a graphical and capacitive touch screen operable to display graphics and detect the presence and location of a physical object on or in proximity to the screen; and a control device configured to output flight planning data and flight navigation data to the screen in response to input received by the screen, wherein the control device is configured to command the screen to display a flight route line from a first waypoint illustrated on a map displayed on the screen to a second waypoint illustrated on the map in response to the object selecting a first point and then a second point on the screen corresponding with the first waypoint and the second waypoint, wherein the control device is configured to command the screen to reconfigure a flight route line to intersect a new waypoint illustrated on the map in response to the object selecting a portion of the screen corresponding to any point along the flight route line and then the object sliding along the screen to a point along the flight route line and then the object sliding along the screen to a point on the screen corresponding to the location of the new waypoint illustrated on the map, wherein the control device is configured to command the screen to display an indication that the flight should hold upon reaching a particular waypoint in response to the object selecting and then circling around a point on the screen corresponding to the particular waypoint.

9. The apparatus of claim 8, wherein the control device is configured to command the screen to display information relevant to a landing approach of the aircraft in response to the object selecting a point on the screen twice in rapid succession, wherein the point on the screen corresponds with a location or waypoint on a map displayed on the screen.

10. The apparatus of claim 8, wherein the control device is configured to command the screen to display a first airway, a second airway, and flight route lines extending between a plurality of waypoints along the first airway in response to the object selecting a first point on the screen corresponding with a first waypoint located on a first airway, selecting a second point on the screen corresponding with any location along the first airway, and selecting a third point on the screen corresponding with any location along the second airway, wherein the plurality of flight route lines extend along the first airway from the first waypoint to a waypoint at an intersection of the first airway and the second airway.

11. The apparatus of claim 8, further comprising a housing for at least partially encasing the screen and the control device.

12. The apparatus of claim 8, further comprising a flight control system within an aircraft, wherein the control device is communicably coupled to and physically integrated with the flight control system.

13. The apparatus of claim 8, wherein the control device is operable to alter at least one of data or graphics displayed on the screen in response to at least one of touching the screen, sliding an object along the screen, and tapping the screen one or more times.

14. An apparatus for flight planning and navigation of an aircraft, the apparatus comprising: a graphical touch screen operable to display graphics and detect the presence and location of a physical object on or in proximity to the screen; and a control device configured to output flight planning data and flight navigation data to the screen in response to input received by the screen, wherein the screen includes a capacitive touch screen, wherein at least one of data or graphics displayed on the screen may be altered by at least one of touching the screen, sliding an object along the screen, and tapping the screen one or more times, wherein the control device is configured to command the screen to display a flight route line from a first waypoint illustrated on a map displayed on the screen to a second waypoint illustrated on the map in response to the object selecting a first point and then a second point on the screen corresponding with the first waypoint and the second waypoint, wherein the control device is configured to command the screen to display a first airway, a second airway, and flight route lines extending between a plurality of waypoints along the first airway in response to the object selecting a first point on the screen corresponding with a first waypoint located on a first airway, selecting a second point on the screen corresponding with any location along the first airway, and selecting a third point on the screen corresponding with any location along the second airway, wherein the plurality of flight route lines extend along the first airway from the first waypoint to a waypoint at an intersection of the first airway and the second airway, wherein the control device is configured to command the screen to display an indication that the flight should hold upon reaching a particular waypoint in response to the object selecting and then circling around a point on the screen corresponding to the particular waypoint.

* * * * *